G. A. TRUESDELL.
LINE FASTENER.
APPLICATION FILED JUNE 29, 1911.
1,009,808.
Patented Nov. 28, 1911.
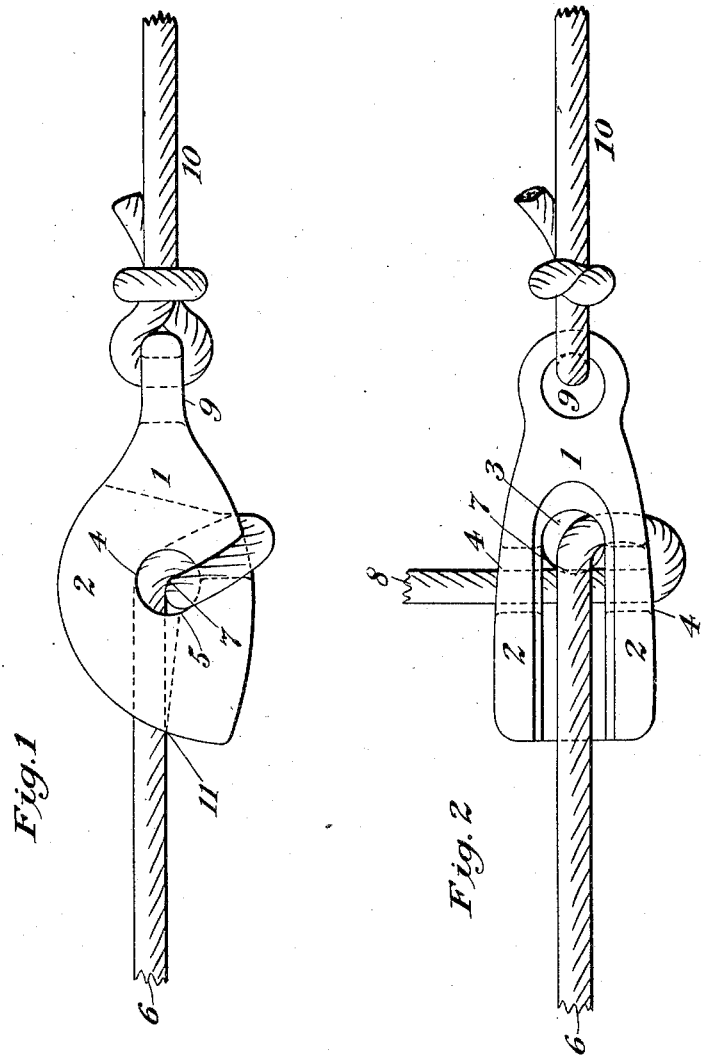
Witnesses:
Inventor:
George A. Truesdell
by Andrew Wilson
Attorney.

UNITED STATES PATENT OFFICE.

GEORGE ANSON TRUESDELL, OF NEW YORK, N. Y.

LINE-FASTENER.

1,009,808. Specification of Letters Patent. Patented Nov. 28, 1911.

Application filed June 29, 1911. Serial No. 635,952.

*To all whom it may concern:*

Be it known that I, GEORGE A. TRUESDELL, a citizen of the United States, residing at the city, county, and State of New York, have invented certain new and useful Improvements in Line-Fasteners, of which the following is a specification.

My invention relates to a device which is adapted to grip and hold a line which is passed through it, in such a manner that the line will be securely held and yet may be readily tightened or released without untying the line or removing it from the device; and my improvements consist in the particulars hereinafter set forth.

In the drawings, Figure 1 is a side view, and Fig. 2 is a top view of one of my improved fasteners, with a rope passed through it, and showing an anchor rope fastened through its eyeleted end.

Corresponding reference numerals designate similar parts in both figures.

The fastener 1 is provided with two side flanges or wings 2, 2, which form an open groove between them. From the bottom of this groove a hole 3, passes through the body of the fastener. Another hole 4, 4, passes transversely through the fastener, the bottom of this hole 4, 4, being preferably somewhat below the level of the bottom of the groove between the wings 2, 2, where the groove and hole intersect at 5.

A line 6 is passed through the groove and then down through the hole 3, then upward and through the hole 4, 4, and under itself at 7, its end 8 extending freely beyond the fastener. The hole 9 is provided for securing the fastener in position as by a rope end 10.

It will be seen that when a strain is applied to the end 6 of the rope it will bite down against its transverse loop at 7 so firmly as to prevent the loop from slipping, although the edges of the holes may be rounded, as shown by the broken lines, to prevent the rope from binding too harshly around sharp angles. This, however, will not prevent the rope from being drawn out by its free end 8, the loop slipping under the body of the rope; and thereby the rope may be tightened as desired, the end 8 being released whenever the desired tension is obtained. If, now, the grooved end of the fastener is depressed, so as to carry the point 11, well away from the rope 6, the strain upon the transverse loop will grow less and less so that the line may be slackened by drawing it back by its end 6, the fastener returning to its original position when released, if there is any tension on the line, and resuming its holding grip upon transverse loop.

In these operations the wings 2, 2, hold the main portion of the line 6 against lateral displacement, and by forming guards around the holes 4, 4 they prevent the loop of the line from escaping from under itself as it might and would do by its free end 8 being drawn out over the end of the fastener by the retraction of the line end 6, if the transverse loop was not held securely in place in the hole through the wings 2, 2. This avoids the necessity of rearranging the loop when the line is to be again tightened and held, as the loop is always in its proper position in the fastener and ready to be tightened by simply pulling on its free end, or loosened by depressing the nose of the fastener, as described. These features make my device particularly desirable for clothes lines and similar ropes which have to be quickly and simply tightened or slacked by persons who are often unskilled in tying knots or in forming securing-loops or hitches.

Having thus described my invention, what I claim and desire to secure by Letters Patent of the United States, is:—

A line fastener embodying a block provided with a rope-channel having an abrupt angle therein, a transverse channel intercepting said abrupt angle, and side guards completely surrounding the ends of said transverse channel.

GEORGE ANSON TRUESDELL.

Witnesses:
AGNES SCHAEFER,
JOHN D. LYTTLE.

Copies of this patent may be obtained for five cents each, by addressing the "Commissioner of Patents, Washington, D. C."